(12) United States Patent
Notaras et al.

(10) Patent No.: US 6,516,598 B1
(45) Date of Patent: Feb. 11, 2003

(54) POWERED VEGETATIVE CUTTING DEVICE

(76) Inventors: John A. Notaras, 18 Hunter Street, Dover Heights, NSW 2030 (AU); Angelo L. Notaras, 86 Victoria Road, Bellevue Hill, NSW 2023 (AU); William P. Notaras, 1/42 Blair Street, North Bondl, NSW 2026 (AU)

( * ) Notice: Subject to any disclaimer, the term of this patent is extended or adjusted under 35 U.S.C. 154(b) by 0 days.

(21) Appl. No.: 09/710,549

(22) Filed: Nov. 10, 2000

(51) Int. Cl.[7] .............................................. A01D 67/00
(52) U.S. Cl. ............................ 56/16.7; 172/17; 56/12.7
(58) Field of Search ................................ 56/12.1, 12.7, 56/12.8, 16.7, 16.9, 17.2, 17.5; 30/276; 172/13–17

(56) References Cited

U.S. PATENT DOCUMENTS 5,603,205 A * 2/1997 Foster ......................... 56/12.7
5,771,670 A * 6/1998 Perry ......................... 56/12.1
6,260,278 B1 * 7/2001 Faher ......................... 30/276

* cited by examiner

Primary Examiner—Robert E. Pezzuto
(74) Attorney, Agent, or Firm—Hugh D. Jaeger

(57) ABSTRACT

A powered cutting device (1) maneuverable in the manner of a wheelbarrow, brush cutter, or stick edger by a walking operator and operable to both horizontally mow and vertically trim vegetation. The cutting device (1) includes an elongated frame (5) having handles (3), a power unit (4) supported by the frame (5), a rotatable vegetative cutter (14, 15), and a power train interconnecting the power unit (4) and the cutter (14, 15). The cutter (14, 15) is movable between a mowing position (FIG. 1) in which it rotates about a substantially vertical axis, and a trimming position (FIG. 4) in which it rotates about a substantially horizonal axis. A releasable latch arrangement maintains the cutter (14, 15) in either of the two positions. The power train includes a power directing arrangement operable to rotate the cutter (14, 15) in each of the positions.

7 Claims, 8 Drawing Sheets

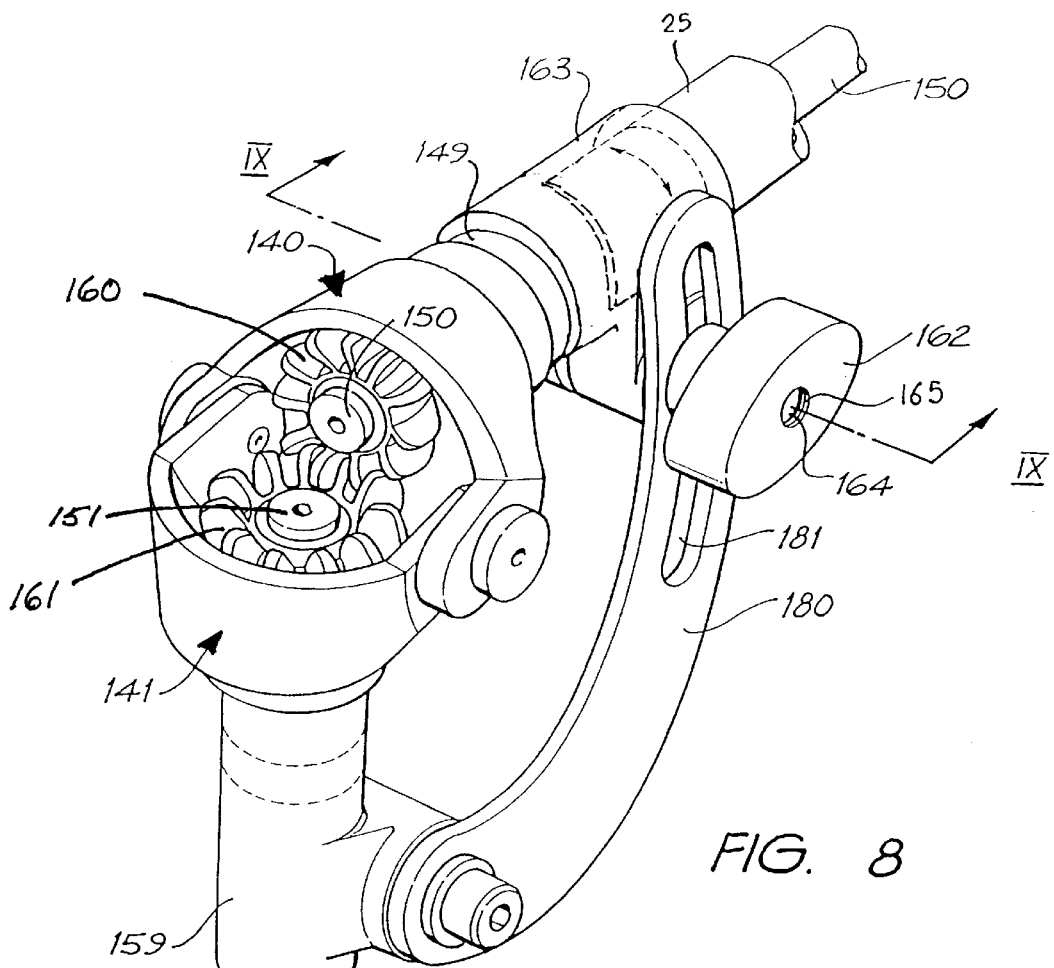
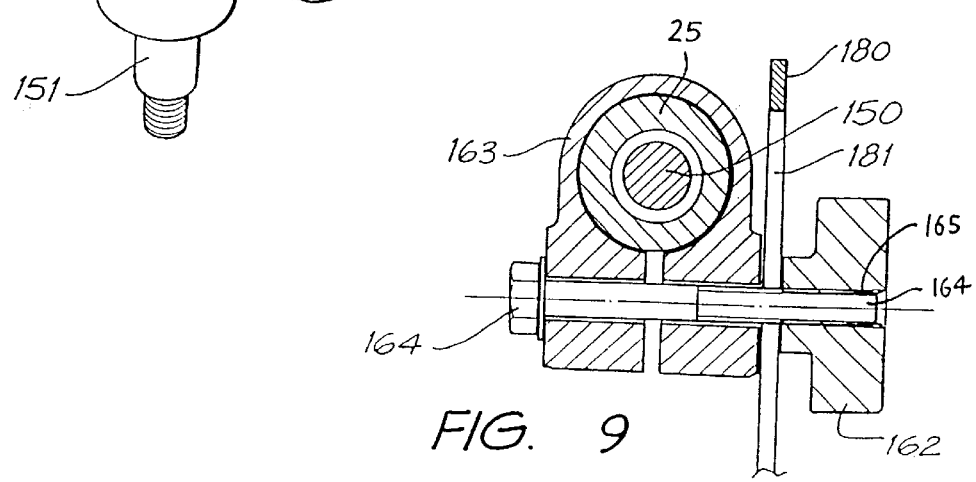
FIG. 8
FIG. 9

POWERED VEGETATIVE CUTTING DEVICE

CROSS REFERENCES TO CO-PENDING APPLICATIONS

None.

FIELD OF THE INVENTION

The present invention relates to powered brush cutters, string trimmers, etc, hereafter referred to as cutting devices. In particular, the present invention relates to a safe, compact and streamlined, powered cutting device which is maneuverable in the manner of a wheelbarrow, brush cutter, or stick edger.

BACKGROUND OF THE INVENTION

Hitherto, powered cutting device have been able to be divided into several categories. The first is a multi-wheeled carriage which is self-supporting on its wheel and which is pushed along its intended path. A known member of this class is essentially a conventional domestic lawn mower type but with a cutting element of nylon or like filaments rotating in a horizontal plane. Another member of this class is the 3 (or 4) wheel lawn edger which can pivot its cutter blade 90 degrees to a horizontal position. The best known category is a hand held device which does not have any ground engaging wheels and which is carried by the operator. The best known of these devices are the various types of brush cutter (or string trimmer) devices.

The brush cutter type of device generally includes a nylon filament as a cutting element. This cutting element is attached to a cutter head which is set at one (lower) end of a long drive shaft. The drive shaft is carried by the operator at an angle of approximately 35° to 45° to the horizontal. The shaft has an engine at its other (upper) end with the engine mostly situated behind the operator and in some other cases beside the operator. The cutter head rotates about a substantially horizontal plane in normal use and is intended, for example, to trim grass growing adjacent tree trunks, to mow vegetation, mostly grass and/or weeds in small and/or awkward areas, and the like. Therefore, it is necessary for such an apparatus to be completely carried in a generally out of balance position. Therefore, it is both difficult and tiring to use.

As a consequence, any health problem of the operator, such as common backache, can be exacerbated by the stooped and unnatural position which the operator is obligated to adopt. The fatigue of the operator is further increased by the need to actually carry, and therefore support the entire weight of, the device during its operation.

Another known device is a stick edger which is constructed similarly to a brush cutter but with a cutting blade rotating in a fixed vertical plane and with a small wheel attached to the blade cover.

It is also known for some prior art cutting devices to be fitted with one or several rollers attached to the device near the cutter head or for the device to be fitted to a dolly. Some of these devices still have their engine alongside, or behind, the operator, so the majority of the weight is still supported by the operator with the same generally awkward stance and movement as described above. One hand of the operator carries the majority of weight whilst the other hand of the operator guides the dolly. Again, this can cause stooping, which exacerbates any back problem. Back problems are a major source of health insurance injury claim and are a major source of injury for manual laborers. In all instances, these dollies, or wheel mounted arrangements, suffer the problem of lack of maneuverability. As a consequent, they are all difficult and awkward to use.

Various prior art devices in the form of a wheeled dolly have been proposed in order to support such brushcutter devices. The following U.S. patents are typical of such devices: U.S. Pat. No. 4,182,100 (Letter); U.S. Pat. No. 4,442,659 (Enbusk); U.S. Pat. No. 4,531,350 (Huthmacher); U.S. Pat. No. 4,803,831 (Carmine); U.S. Pat. No. 4,879,869 (Buckendorf, Jr.); U.S. Pat. No. 4,894,916 (Nimz et al.); U.S. Pat. No. 4,922,694 (Emoto); U.S. Pat. No. 4,936,886 (Quillen); U.S. Pat. No. 5,029,435 (Buchanan); and U.S. Pat. No. 5,095,687 (Andrew et al.).

A further problem to be considered is the restrictions to be placed on small two-stroke (two-cycle) engines because of the pollution such engines create over and above that created by four-stroke engines. As a consequence, the light weight two-stroke power units currently used in brushcutters and similar devices are likely to be banned in some jurisdictions in the future for anti-pollution reasons. The engineering result of this is that commercially acceptable power units are henceforth likely to be restricted to four-stroke internal combustion engines and electric motors, both of which are substantially heavier than two-stroke engines. It follows, therefore, that in the future those brush cutters in which the operator carries the weight of the apparatus will become impractically heavy.

The wheeled carriage class of lawn edger typically has three (or sometimes four) wheels arranged so as to enable the edger to be free standing, with upstanding handles, and also self-supporting on its wheels. Some of these edgers can swivel their vertical blades to a horizontal plane to trim grass and vegetation in a horizontal manner. The device is pushed in a manner analogous to that of a lawn mower. Because these self-supporting 3 and 4 wheeled carriage grass edgers have a long wheel base to self-support the apparatus, when pushed (forward) their natural track is straight. Therefore, to push around a curve is difficult with the operator having to "bounce", or reciprocate, or drag, the apparatus around, to try to approximate the desired curve which the non-steerable carriage wheels will not follow.

These prior art lawn edgers, to cut horizontally, have mechanisms that take the form of a tiltable axis of rotation of the cutter, and a V-belt drive which is able to accommodate the necessary twisting required whilst still transmitting power. The power unit remains untilted. Whilst such arrangements are functional, the devices are heavier, more complicated and more expensive. In addition, the (often exposed) V-belt drives are dangerous.

Examples of prior art wheeled carriage devices which have attempted to deal with this problem include: U.S. Pat. No. 2,680,945 (Reed); U.S. Pat. No. 2,791,875 (Faas); U.S. Pat. No. 2,847,813 (Hansen, Jr. et al.); U.S. Pat. No. 2,855, 742 (Cooper); U.S. Pat. No. 3,090,186 (Dykes); U.S. Pat. No. 3,193,996 (Wellborn); U.S. Pat. No. 3,490,213 (Pinto); U.S. Pat. No. 3,743,028 (McCloud); U.S. Pat. No. 4,962,631 (Braun et al.); U.S. Pat. No. 5,156,217 (Hirata et al.); and U.S. Pat. No. 5,165,485 (Fujikawa et al.). The MASPORT (Registered Trade Mark) model 6002 DLX which is commercially available in the USA also has a blade tilting arrangement. All of these "heavy duty" wheeled edgers are heavy and bulky, difficult to transport, cannot fit into a boot or trunk of even a large car, and require a great deal of room for storage.

Another example of a prior art device in which the cutting blades are able to be tilted out of the vertical plane is provided by U.S. Pat. No. 2,970,419 (Lieberman). This device enables a cut to be achieved both in a horizontal plane and in a vertical plane. When cutting in a horizontal plane the device is supported by a pair of wheels 40, and when cutting in a vertical plane the device is supported by a roller 54. U.S. Pat. No. 2,672,002 (Nelson) discloses a somewhat similar device which, when cutting in the vertical plane, is supported by single wheel 15 in front of the cutter blade, but when cutting in the horizontal plane is supported by a skid bar 28. Because of the skid bar 28, it is necessary to "shove or push" the device in the direction of the skid bar 28 utilizing a handle of which only the stem 31 is illustrated. The handle is said to have "any desirable cross-head" and, therefore, is presumably generally T-shaped in configuration.

U.S. Pat. No. 2,621,463 (Skillman) discloses a similar arrangement in which the device is supported in both cutting actions by a roller 11 having a substantial axial extent. Again, the cutting blades are able to be pivoted so as to cut in either a horizontal plane or a vertical plane. U.S. Pat. No. 2,632,990 (Stricklen et al.) discloses a single wheeled carriage device with a free standing and upstanding handle. The carriage has supporting shoes or skids 20 to maintain the carriage upright in the rest position. The devices is able to cut either vertically or horizontally. When cutting horizontally (FIG. 3), the cutter blade is able to be pivoted in a horizontal plane about a vertical axis on a cutter support arm which produces an out of balance situation whereby the unit is unstable and can tip over, whether in use or at rest. A complex belt drive is required.

U.S. Pat. No. 2,618,919 (Hutchens) also discloses a single wheeled carriage arrangement with both a horizontally cutting trimmer blade 11 and a vertically cutting cutter blade 19. Each of these blades is able to be swivelled to a tilted position and independently operated so that two simultaneous inclined cuts or two simultaneous horizontal cuts are able to be achieved. This device is supported by a single wheel and a pair of short legs 31. The device has a conventional free standing and upstanding handle (of which only the shaft 29 is illustrated). The handle 29 is therefore presumed to be the then conventional T-shaped lawn mower handle. Each cutting blade, in order to swivel, is mounted on an outrigger journal. Except for the handle arrangement, the device is of very broad dimensions with the cutters extending a long way forward of the single wheel. This single wheel is placed approximately midway front to rear and approximately on the centerline of this carriage device to constitute both a front to rear and a left to right pivot point. However, the carriage has substantial masses located at some distance from the pivot or balance point. As a result, the device is unwieldy, being difficult to balance and therefore difficult to use.

U.S. Pat. No. 2,708,335 (Newton) also discloses a single wheel device which in this instance is able to cut both horizontally and vertically. The single wheel supports the motor and cutter blade while cutting vertically. It is not clear how the device is supported during horizontal cutting as illustrated in FIG. 5. In this device the handle 27 consists of a single bent tube and therefore it would be necessary for the operator to keep a very firm grip on the handle in order to prevent the device from twisting or tilting whilst cutting vertically. U.S. Pat. No. 2,653,381 (Rooke) discloses a similar device with a rod-like handle 27 which again has a single grip 43. A roller 36 supports the device whilst trimming vertically and the device appears to be supported by skids whilst cutting horizontally.

U.S. Pat. No. 4,033,098 (Green) discloses a device for cutting horizontally which has a single wheel 11 and a pair of spaced apart handles 33. As seen in FIG. 5, in order to cut grass adjacent a wall 42, it is necessary for the handles 33 to be released, then twisted to one side and then secured in that position in order that the operator's hand not be scraped during the passage along the wall 42. Furthermore, because the large motor 12 is mounted forwardly of the wheel 11, the center of gravity of the device is forward of the wheel 11. Therefore, in operation it is necessary for the handles 33 to be forced downwardly in order to maintain the correct cutting height. If, during operation, the handles 33 are inadvertently released, then the cutting elements 28 immediately impact with the ground, which is extremely dangerous.

Another single wheeled device in which the center of gravity is forward of the single wheel is that disclosed in Australian Patent No. 107,917 (Collins and Henderson). This device has a cutting disc 4 which normally rotates in a horizontal plane above a pair of skids 16 which assist to support the weight of the device. The weight of the cutting arrangement means that the center of gravity of the device is forward of the wheel 2, notwithstanding that the engine 3 is mounted above, but just behind, the wheel 2. Again, in operation it is necessary for the operator to push down on the handles 13 in order to relieve the weight on the skids 16.

U.S. Pat. No. 4,845,929 (Kawasaki et al.) again discloses a device for cutting horizontally in which a pair of wheels is positioned inside a dome-shaped cutting disc. The wheels are pivotable about a vertical axis in order to permit cutting in different directions. In the second embodiment of FIGS. 19–23, the trimmer is supported by a pair of running wheels 8 and a skid 170 (column 12, line 37) but designated 156 in FIG. 20. This indicates that the center of gravity of the device is forward of the wheels 8 and therefore the guide handles 6 have to be depressed in order to operate the device.

Another example of a prior art brush cutting device using a nylon filament is a two wheeled device in essence similar to a rotary four wheel lawn mower with extended horizontal cutting disks but with only two rear wheels. The center of gravity is forward of the two wheels as the brush cutting head extends forward. Again, pressure has to be exerted downwards on the handles to lift the cutting head away from the ground. This type of unit is large and not easy to maneuver due to its bulk. The complete machine cannot be laterally tilted on its longitudinal axis to cut closely against a wall (when trimming along the wall) or along a footpath's edge. This machine is commercially available in the USA being sold under the trademarks DR TRIMMER or DR MOWER and has a 6 horsepower engine. This category of trimming machines also cannot fit into a boot or trunk of even a large car, and requires a great deal of room for storage.

It is the object of the present invention to substantially overcome or ameliorate some of the above-mentioned disadvantages and problems by the provision of a powered cutting device which is steerable with both hands, able to be maneuvered in substantially the same fashion as a wheelbarrow, brush cutter, or stick edger, and able to either mow substantially horizontally or trim substantially vertically.

SUMMARY OF THE INVENTION

In accordance with the first aspect of the present invention there is disclosed:

a powered vegetative cutting device maneuverable in the manner of a wheelbarrow, brush cutter, or stick edger by a walking operator or operable to both substantially horizontally mow and substantially vertically trim vegetation, said cutting device including:
an elongated frame having handle means;
a power unit supported by said frame;
a rotatable vegetative cutter means; and
a power train interconnecting said power unit and said cutter means,
wherein said cutter means is movable between a mowing position in which it rotates about a substantially vertical axis and a trimming position in which it rotates about a substantially horizontal axis, a releasable latch means operatively associated with said power train and said frame for maintaining said cutter means in either one of said positions, and said power train including a power directing means operable to rotate said cutter means in each said position.

In one form, the handle means are at one, rearward, end of the frame, a ground engaging wheel means is at the other, forward, end of the frame, the cutter means is located forward of said wheel means, and the power unit is located intermediate said ends of the frame, thereby causing the center of gravity of said cutting device to lie between said handle means and said wheel means.

In another form, the power unit is located at one, rearward, end of the frame, the cutter means is located at the other, forward, end of the frame, and the handle means are located intermediate the power unit and the cutter means.

The cutting device preferably includes a ground engaging wheel means located rearwardly of the cutter means.

The power directing means is preferably located within a flexible boot.

In an embodiment, the power directing means comprises a universal joint.

In another embodiment, the power directing means comprises a pair of gimbals pivotally connected together, each gimbal having a shaft rotatably mounted therein, one of said shafts being driven by said power unit, the other of said shafts driving said cutter means, each of said shafts having one of two intermeshed bevelled crown gears at its free end, and the angle between said shafts being adjustable by said gimbals pivoting relative to each other.

The releasable latch means preferably comprises a slotted link member fixed to one of said gimbals, a split sleeve enveloping part of the other of said gimbals and said frame, and clamping means passing through said link member and split sleeve to clamp said other gimbal, frame and link member together.

The cutter means preferably comprises a pair of nylon filaments.

The cutting device preferably includes a filament guard mounted adjacent to said cutter means and between said cutter means and said handle means, said filament guard being movable with said cutter means between said mowing and trimming positions.

The cutting device preferably includes height adjustment means to vary the height of said cutter means above said ground engaging wheel means.

The power unit is preferably an internal combustion engine or electric motor.

In accordance with a second aspect of the invention there is disclosed a method of cutting vegetation comprising the steps of:
a. using a powered cutting device steerable in the manner of a wheelbarrow, brush cutter, or stick edger by a walking operator and having a cutter means and handle means grasped by said operator, to mow an area of vegetation with said cutter means rotating about a substantially vertical axis;
b. moving said cutter means so that it rotates about a substantially horizontal axis; and,
c. using said power cutting device to vertically trim at least a portion of the periphery of said area of vegetation.

In accordance with a third aspect of the invention there is disclosed a method of cutting vegetation comprising the steps of:
a. using a power cutting device steerable in the manner of a wheelbarrow, brush cutter, or stick edger by a walking operator and having a cutter means and handle means grasped by said operator, to vertically trim at least a portion of the periphery of an area of vegetation with said cutter means rotating about a substantially horizontal axis;
b. moving said cutter means so that it rotates about a substantially vertical axis; and,
c. using said powered cutting device to mow said area of vegetation.

Both methods preferably include the step of laterally tilting said handle means whilst trimming to tilt said substantially horizontal axis.

Preferably, the cutting device can be operated without tiring the operator. The cutting device has a negligible turning circle, is able to be tilted easily to either side, and its frame supports a substantial part of the weight of the powered cutting device. In addition, the cutter means is able to follow the surface, should it be undulating, without upsetting the stability of the machine. The cutting device is also preferably able to be placed in an operational rest position, either voluntarily or in an emergency, with the cutter means always remaining above the ground surface.

BRIEF DESCRIPTION OF THE DRAWINGS

Preferred embodiments of the present invention will now be described, by way of examples only, with reference to the accompanying drawings in which:

FIG. 8 is a view similar to FIG. 7 but illustrating a latching arrangement;

FIG. 9 is a cross-section view along the line IX—IX of FIG. 8;

DETAILED DESCRIPTION OF THE PREFERRED EMBODIMENTS

Figure 1:
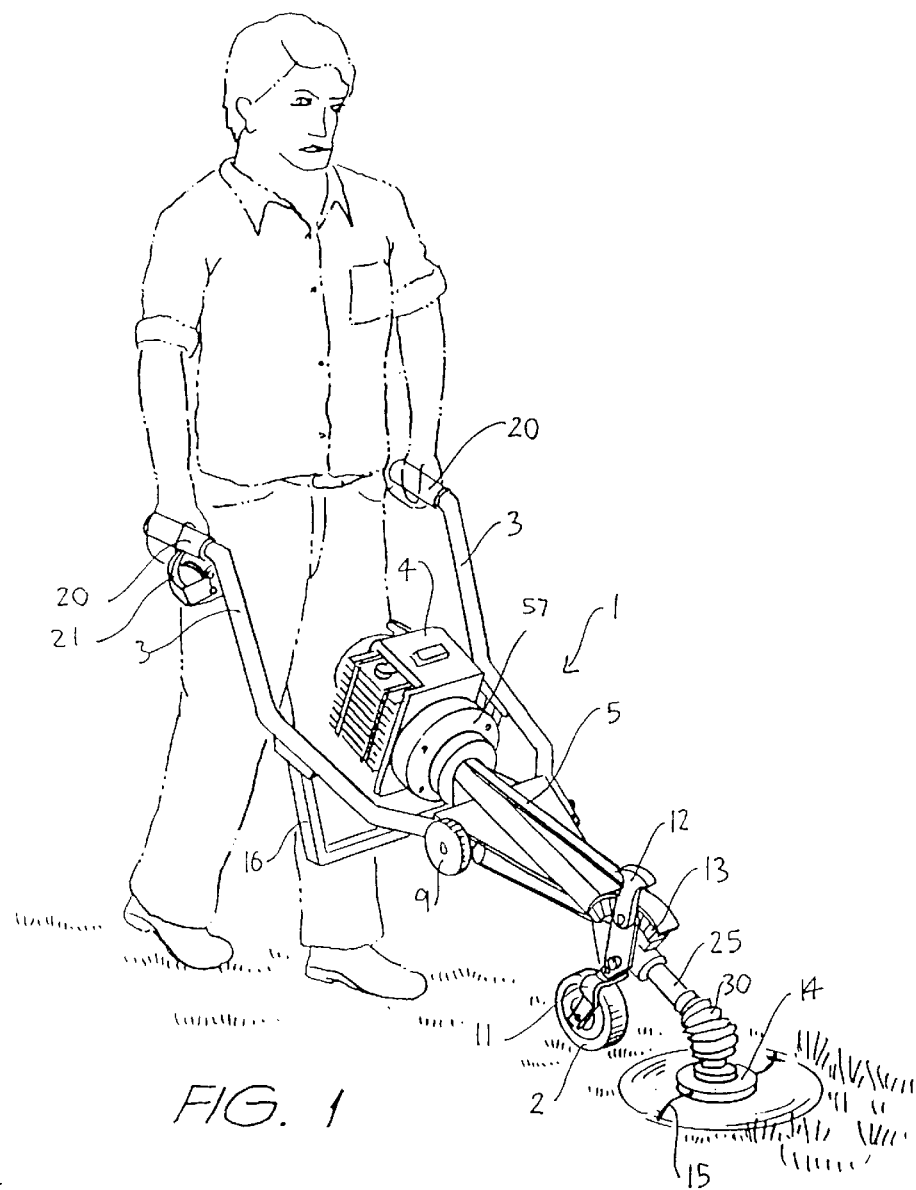
FIG. 1 is a front view in perspective of a first powered cutting device able to both horizontally mow and vertically trim, and illustrating the former.

As seen in FIGS. 1 to 6, the cutting device 1 of the first preferred embodiment takes the form of a slender wheelbarrow device having a single ground engaging wheel 2 of appreciable diameter, a pair of handle bars or handles 3 with hand grips 20, and a power unit or engine or motor 4, all arranged about a generally elongate narrow frame 5 with a ground contacting leg stand 16. The power unit 4 has a throttle control 21 and, if desired, a brake (not shown). The wheel 2 has a sufficiently large diameter to enable the cutting device 1 to be easily rolled like a wheelbarrow, including rolling over steps, rough terrain, lawn, tangled grass, garden bed peripheries, etc. The wheel 2 is below the elongated frame 5 and preferably on, or close to, the longitudinal centerline of the cutting device 1.

The power unit 4 can be either an electric motor or any type of internal combustion engine. The power unit 4 is positioned in front of the operator and is mounted at the head of the frame 5 and is generally provided with a conventional speed dependent centrifugal clutch positioned under a clutch cover 57.

The handle bars 3 are releasably secured to the frame 5 by means of a releasable handle 9. The frame 5 and handles 3 have a generally Y or V-shaped configuration. The handles 3 are preferably detachable so as to place the cutting device 1 in a transport or storage configuration having a reduced overall length. The cutting device 1 is then able to be easily placed in the boot or trunk of even a small motor vehicle.

Figure 2:
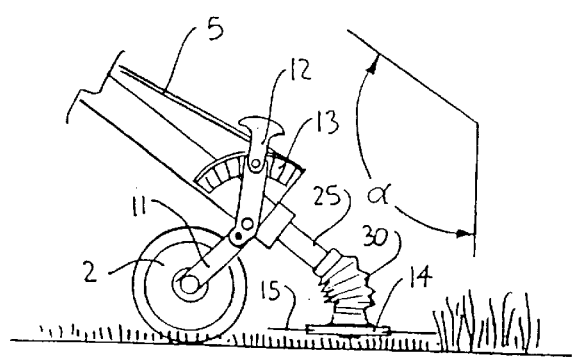
FIG. 2 is a right side elevation view of the cutting arrangement of the cutting device of FIG. 1 during mowing.
Figure 3:
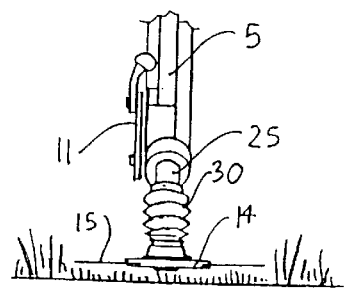
FIG. 3 is a front elevation view of the cutting arrangement of the cutting device of FIG. 1 during mowing.
Figure 4:
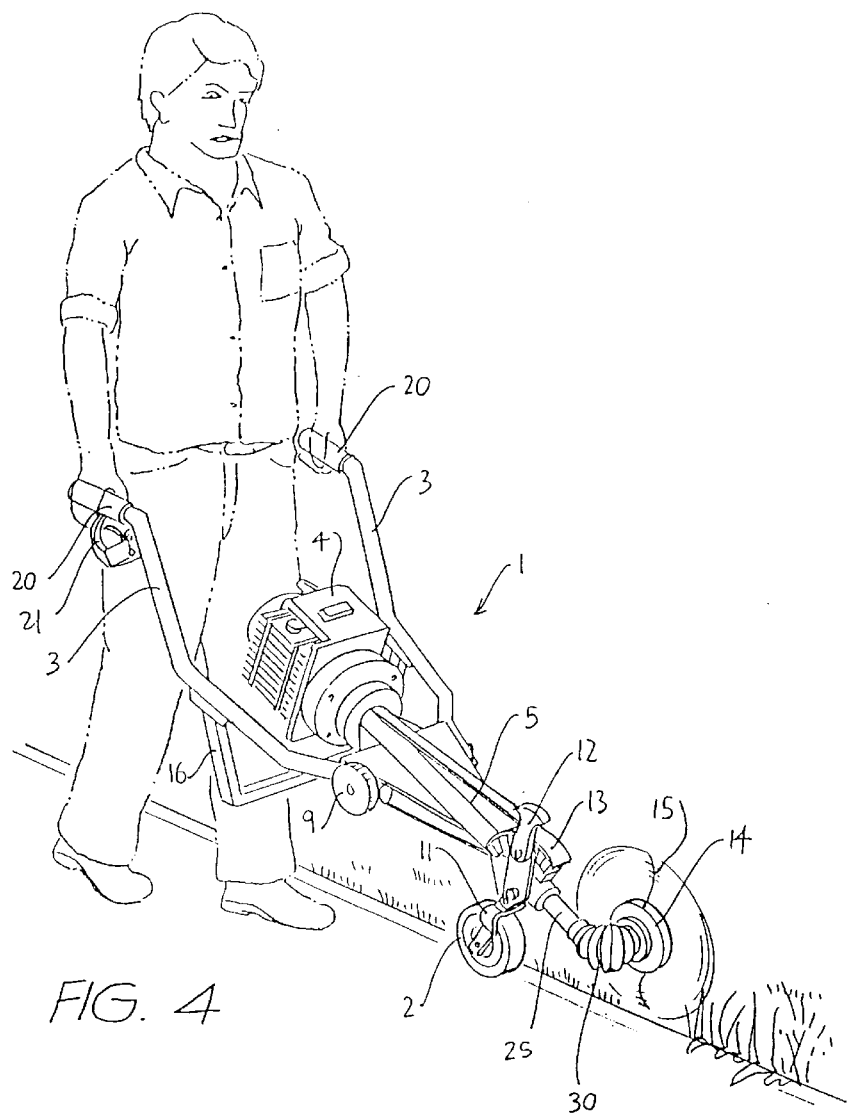
FIG. 4 is a view similar to FIG. 1 but illustrating the cutting device vertically trimming.
Figure 5:
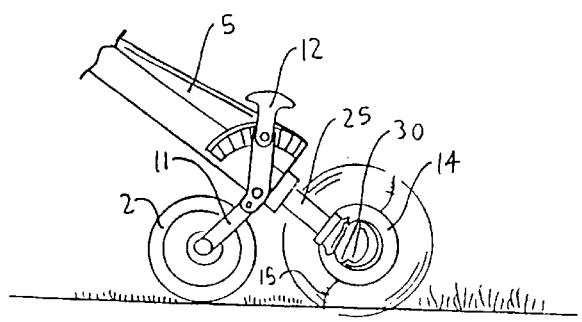
FIG. 5 is a side elevation view similar to FIG. 2 but illustrating vertically trimming.
Figure 6:
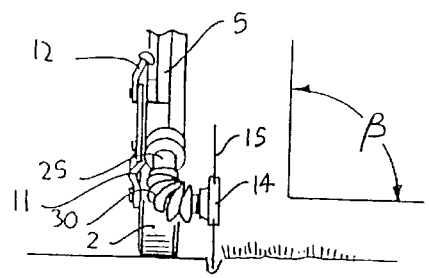
FIG. 6 is a front elevation view similar to FIG. 3 but illustrating vertically trimming.

Extending from the forward end of the frame 5 is a pivoted arm 11 on the free end of which the wheel 2 is rotatably mounted. The arm 11 is pivotal by means of a resilient height adjustment handle 12 which is biased so as to be able to be set by the operator and retained in a setting in any one of a number of positions relative to a height setting plate 13 which includes a number of apertures. A conventional plastic hub 14 housing a pair of nylon filaments 15 extending therefrom is also mounted at the forward end of the frame 5. The filaments 15 are rotatable in a plane by the power unit 4 which in FIGS. 1 to 3 is horizontal and which in FIGS. 4 to 6 is vertical. The cutting device 1 is shown with its filament guard removed for clarity purposes.

It will be apparent to those skilled in the art that the handle 12 and plate 13 permit the height above the ground of the filaments 15 to be adjusted for any given angle of inclination of the transmission frame 5 relative to the ground by the raising or lowering of the plastic hub 14. Thus, although the operator is able to raise or lower the handles 3 and thereby tilt the frame 5 in a small arc within a vertical plane about the point of engagement of the wheel 2 with the ground, this adjustment is small. The fundamental height setting is adjusted by the height adjustment mechanism in the form of the arm 11, handle 12 and plate 13. This enables the height to be set by each operator. Advantageously, the step-by-step height adjustment cannot change during use, as do sliding adjustments which rely upon friction to clamp the slide in position.

A stem 25 extends from the forward end of the frame 5 to a power directing arrangement located within a flexible rubber boot 30. In the simplest form of arrangement, the boot 30 covers a substantially conventional universal joint. However, in the preferred arrangement illustrated in FIG. 7, the boot 30 covers a pair of crown gears 160, 161 which form the preferred power directing arrangement and which will be described hereafter.

In the mowing configuration illustrated in FIGS. 1 to 3, the axis about which the filaments 15 rotate is substantially vertical and forms an angle α with the stem 25. However, as indicated in FIGS. 4 to 6, the filaments 15 are rotatable relative to the stem 25 so as to be rotatable in a vertical plane. Thus, the axis about which the nylon filaments 15 rotate lies in a substantially horizontal direction and consequently is at an angle of approximately 135° to the stem 25, as indicated by β in FIG. 7.

In the vertical trimming configuration illustrated in FIGS. 4 to 6, it will be apparent that the cutting device 1 operates in substantially the same manner as a wheelbarrow and, therefore, has all the advantages of wheelbarrow-like operation, such as being able to tilt the plane of rotation of the cutting device slightly from the vertical. However, in the mowing configuration illustrated in FIGS. 1 to 3, the plane of rotation of the cutting filaments 15 is substantially horizontal. In this configuration, the operator keeps both handles 3 substantially level, thereby maintaining level the plane in which the filaments 15 rotate. However, by moving the handles 3 in a substantially horizontal arc from left to right, the operator is able to move the nylon filaments 15 in a similar horizontal arc. This is useful for mowing adjacent concave garden bed walls and the like. This motion is in addition to the regular mowing technique where the operator simply walks in a straight line maintaining the handles 3 at an even height and thereby cuts a uniform rectangular strip or swathe in substantially the same manner as a conventional lawn mower as used.

It will be apparent from FIGS. 1 to 7 that the cutting device 1 is particularly attractive to those householders having only a relatively small area of grass which needs to be mown but which can sometimes have a relatively complicated periphery which needs to be edged. Having one device which is able to accomplish both mowing and edge trimming actions obviates the expense of owning both a conventional lawn mower and a conventional edger. It will also be apparent that in carrying out both moving and trimming operations, the operator has complete freedom as to whether to first mow and then vertically trim or whether to first vertically trim and then mow.

Should the terrain in a confined area include a steep dip, a machine with a long wheel base (distance fore and aft between the wheel axles or left to right between the wheels) is unable to follow the terrain. This results in some areas with the grass being left too long, and some areas with the grass scalped or cut too short to expose soil. Hitherto this problem was solved by use of a hand-held brush cutter device and the area was not mown in the conventional sense. However, now the cutting device of FIGS. 1 to 6 can be used to mow the previously offending area to a substantially uniform grass height.

Figure 7:
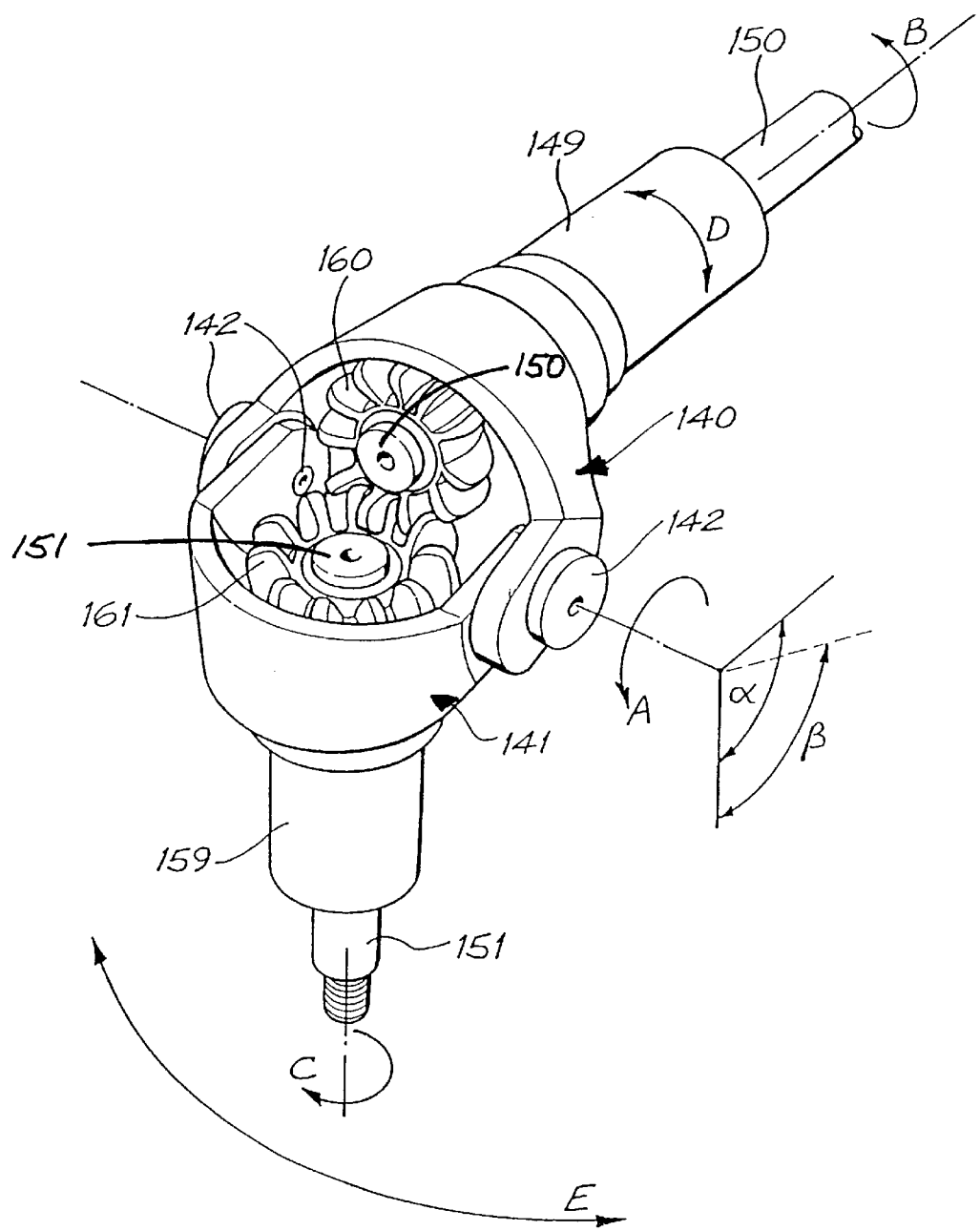
FIG. 7 is a view of one form of the power directing arrangement located within the flexible boot of FIGS. 1–6.

Turning now to FIG. 7, preferably located within the boot 30 is the power directing arrangement which consists of two gimbals 140 and 141 which are pivoted about pins 142 so as to permit gimbal 141 to pivot relative to gimbal 140 in the direction of arrow A indicated in FIG. 7.

In addition, each of the gimbals 140, 141 provides a bearing for a corresponding shaft 150, 151. The shaft 150 extend within the stem 25 and is driven in the direction of arrow B by the power unit 4. As a consequence of the bevelled crown gears 160, 161 mounted at the adjacent ends of the shafts 150, 151, respectively, the rotation of shaft 150 in the direction of arrow B drives shaft 151 in the direction of arrow C.

In the configuration of FIGS. 1 to 3, the angle α is approximately 135° and typically lies within the range of 120°–145°. In the configuration illustrated in FIGS. 4 to 6, the angle β between the two shafts 150, 151 is approximately 90° caused by the rotation of the gimbal 141 relative to the gimbal 140. This results in a different degree of meshing of the crown gears 160, 161. However, although the area of overlap or contact of the gear teeth changes, there is still sufficient area for the power to be safely and successfully driven through the power directing arrangement. Also, any convenient gear ratio can be arranged so that the function of a gearbox is thereby also achieved.

In order to convert between the mowing configuration of FIGS. 1 to 3 and the trimming configuration of FIGS. 4 to 6, it is also necessary to rotate the gimbal 140 relative to the shaft 150 in the direction of arrow D illustrated in FIG. 7. This results in the shaft 151 moving in the arc indicated by arrow E of FIG. 7. This requires a latching arrangement between the gimbal 140 and the stem 25 so as to permit the gimbal 140 to be rotated between two positions which are mutually perpendicular relative to the stem 25. This rotation is carried out when the power unit 4 is not operating and, therefore, the power train is not rotating.

A simple form of latch arrangement to permit the gimbals 140 and 141 to move between the two positions (mowing and trimming) relative to the stem 25 is schematically illustrated in FIGS. 8 and 9.

The gimbals 140, 141 have cylindrical stems 149, 159, respectively. One end of an arcuate link 180 is secured to the stem 159 of the gimbal 141. The link 180 has an arcuate slot 181. The link 180 and the slot 181 can also be straight.

The driven shaft 150 passes through the stem 25 and the stem 149 the ends of which abut and are rotatable relative to each other. A split sleeve 163 is integrally formed with the stem 149 and pivotally receives the end of the stem 25. A bolt 164 passes through the split sleeve 163, through the arcuate slot 181 and into a threaded aperture 165 of a manually rotatable nut 162.

When the nut 162 and bolt 164 are manually tightened, this clamps the sleeve 163, thereby fixing the position of stem 25 relative to stem 149. This determines whether mowing or edging takes place.

Similarly, the position of bolt 164 in the slot 181 is fixed, thereby simultaneously fixing the angle of stem 159 of gimbal 141 relative to stem 149 of gimbal 140. That is, with reference to FIG. 7, either the angle α or β is set for mowing or edging respectively.

Naturally, releasing the nut 162 enables these fixed positions to be changed to again change from mowing to edging or vice versa. These adjustments are made with the power unit 4 off and neither shaft 150 nor 151 rotating.

Figure 10:
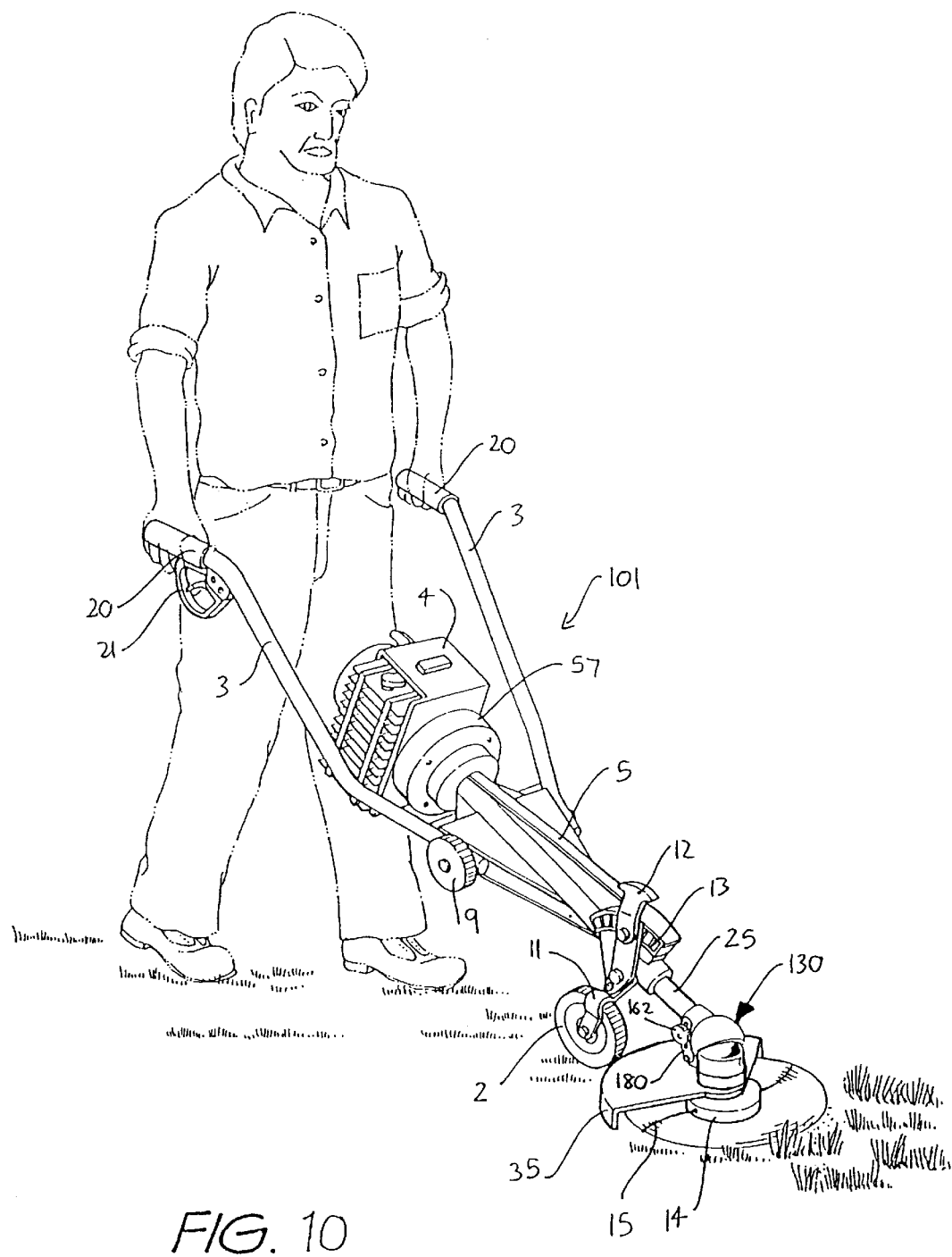
FIG. 10 is a view similar to FIG. 1 but of a second powered cutting device able to both horizontally mow and vertically trim, and illustrating the former.
Figure 11:
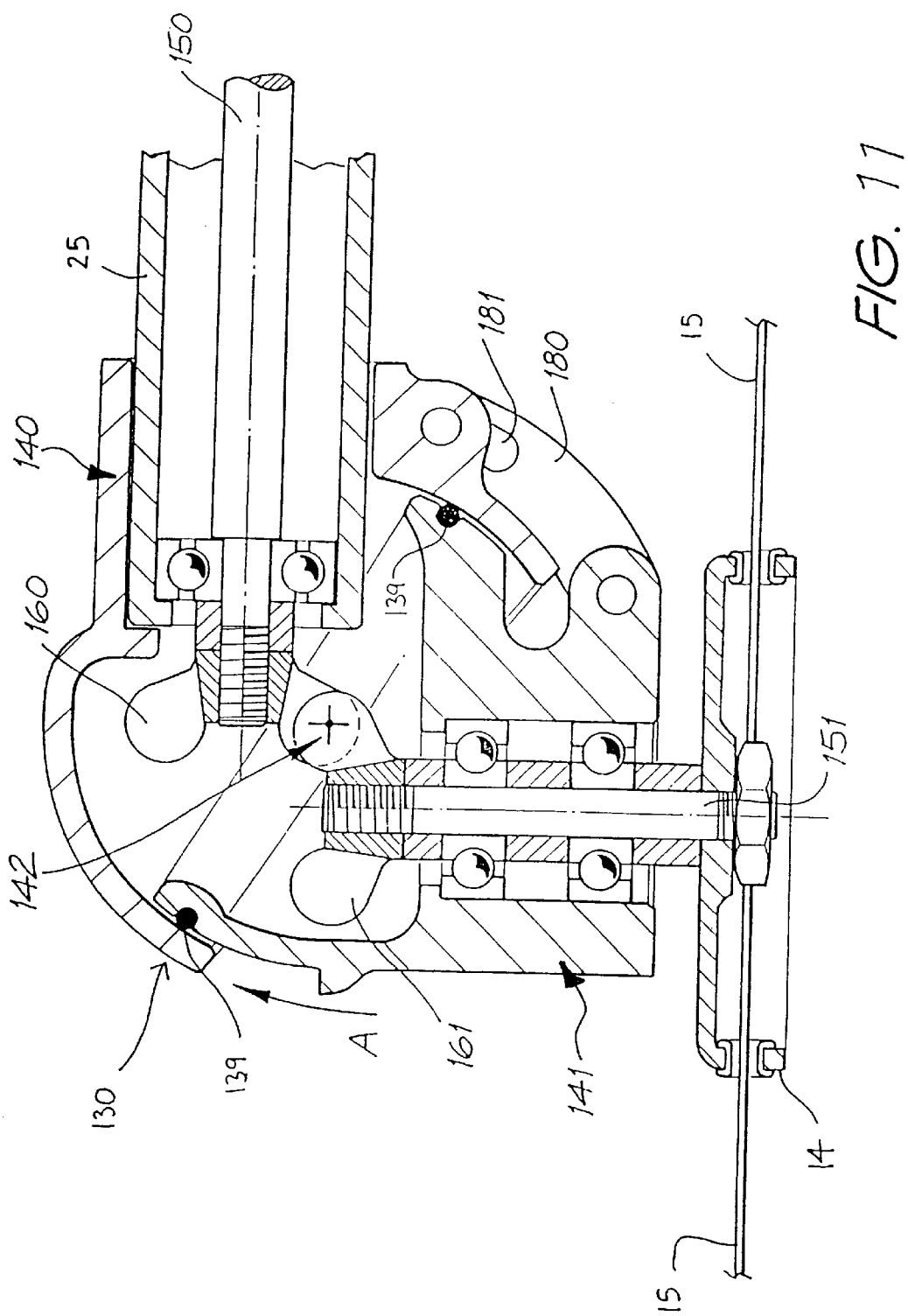
FIG. 11 is a cross-section view of one form of the power directing arrangement located within the gearbox casing of FIG. 10.

FIGS. 10 and 11 show a second embodiment of a powered cutting device 101 able to horizontally mow (as illustrated in FIG. 10) and vertically trim, in which like reference numerals to those used in describing the first embodiment of the powered cutting device 1 are used to indicate like features. The power directing and latching arrangements shown in FIG. 11 are more compact than that shown in FIGS. 8 and 9. The arrangement of FIG. 11 functions identical to that of FIGS. 8 and 9 except that the gimbals 140, 141 are extended to overlap and form an external gearbox casing 130, thereby obviating the need for the rubber boot 30. An O-ring seal 139 between the two gimbals 141, 141 retains the lubricant for the gears and prevents contaminants (e.g., dirt, grass clippings) from coming into contact with the gears 160, 161. The cutting device 101 also includes a filament guard 35.

It will be apparent to those skilled in the art that the cutting devices 1 and 101 are mechanically similar to a slender wheelbarrow, in that the centers of gravity of the cutting devices are positioned in a substantially vertical plane located between the handles 3, and are also positioned between the wheel 2 and the handles 3. As a consequence of this arrangement, the greater part of the weight of the cutting devices is borne by the wheel 2 and only a small part is supported by the operator. In addition, in operation the cutting devices are subjected to forces at only three locations, the wheel 2 and both handles 3. This makes for a very stable arrangement.

However, the cutting devices differ from conventional wheelbarrows in relation to the position of the center of gravity relative to their frames. In a conventional wheelbarrow, especially one carrying a heavy load, the center of gravity is above the frame. Thus, if one handle is lowered, and/or the other raised, an inherently unstable position is quickly reached and the operator may be unable to prevent the load spilling out sideways as the wheelbarrow rotates about its longitudinal axis.

This is to be contrasted with the above-described embodiments, where the centers of gravity (determined to a certain extent by the position of the power unit 4) lie on, or close to, the longitudinal axis of the frame 5. This has the result that the mass is basically concentrated along the longitudinal axis of the frame and only the handles diverge from this axis to any considerable extent. Thus, the handle grips 20 can be comfortably moved laterally in a fully controlled arc about the longitudinal axis of the frame 5 without the cutting devices becoming unstable in any way. This makes for particularly easy tilting of the cutting devices in order to quickly and precisely tilt the filaments 15 into any desired cutting angle by any operator and without any difficulty.

Because of the slender wheelbarrow-like configuration of the cutting devices, like a wheelbarrow the cutting devices have no minimum turning circle and can be turned through 360° on a spot. The cutting devices can also be steered by moving the handles 3 to the left or right about a vertical axis passing through the wheel 2. In operation, by lifting one of the handles 3 and/or lowering the other handle, the handles 3 are thereby easily twisted about the longitudinal axis of the frame 5. This lateral tilting or twisting action through a short arc moves the plane in which the filaments 15 rotate. This movement is able to be achieved quickly and easily by the operator in response to changing conditions, any obstacle, etc.

As indicated in FIGS. 1, 4 and 10, the operator is normally positioned directly behind the cutting devices and operates by walking in a natural stance forward along the desired line of mowing/trimming. This natural stance enables the operator to work for long periods without tiring. Since the operator is not stooped, and has a straight back, the operator can work without fear that serious back injury may eventually occur.

Also, because the cutting devices are light and well balanced, the operator can be comfortably positioned to either side of both handles for any reason, for example, to allow the cutting devices to mow/trim under overhanging bushes or trees where a directly following operator cannot follow. Alternatively, the operator being positioned to one side or the other (of the handles) is able to maneuver the cutting devices around the perimeters of small irregular shaped flower beds, or to side step around obstacles such as a small bush, water tap, garden hose reel, mud puddle, or any other obstacle.

Therefore, it is not necessary for the operator always to be positioned directly behind the cutting devices, even if the cutting devices move along a straight line of cut. Thus, the operator can easily and quickly side step from one extreme on one side of both handles through to the other extreme on the other side of both handles. This change in operator position can be carried out wherever it is necessary without altering or adjusting hand positions of the operator. That is, the position of the arms and body changes relative to the substantially unchanged position of the hands and cutting device. Thus, the operator retains a full and comfortable control of the cutting device at all times.

This unique separate and/or combined operator/cutting device flexibility can be carried out without any strain or bother to the operator and without tiring the operator.

The narrow profile of the front of the cutting devices also allows same to work into narrow confines of space, for example where a post or other structure is positioned close to a curb or path. This is impossible for typical 3 (or 4) wheeled carriage type edgers or prior art single wheeled carriage cutting devices.

If the power unit 4 is an internal combustion engine, the stand 16 (or the handles 3/handle grips 20 if not stand is provided) can be rested on the ground. As a consequence, the cutting devices are positioned in a very stable and secure position, coming into contact with the ground only in two (or three) positions: namely, the bottom of the stand (or each of the handles 3/handle grips 20) and the bottom of the wheel 2. In this position the filaments are clear of the ground.

With the cutting devices in this stable position, the operator is able to pull the starting cord of the internal combustion engine 4 whilst being well away from the filaments 15 but adjacent to the throttle control 21. As a consequence, any spinning of the filaments 15 which may occur because of higher revolutions of the internal combustion engine at the time of starting, occurs with the operator safely positioned well away from the rotating filaments 15. After starting, the engine is idled and the automatic centrifugal clutch disengages the filaments 15 from the engine 4.

Of course, if the power unit 4 is an electric motor, a throttle trigger with safety interlock controls an electric on-off switch inside the motor housing and can be easily manipulated in the operating position. An electric motor can be either a mains operated AC or DC motor or a battery pack operated DC motor.

Irrespective of whether a brake for the filaments 15 is provided or not, the operation of the cutting devices are as follows. With the engine idling, the operator lifts both handles 3 off the ground and then holds same with the arms relatively straight and extending directly towards the ground, as illustrated in FIGS. 1, 4 and 10. The throttle control 21 can then be actuated to increase engine speed. The cutting devices are then wheeled along a desired mowing/trimming path to commence the mowing/trimming operation. It will be apparent from FIGS. 1, 4 and 10 that filaments 15 are located in a plane which passes between the handles 3 and that the operator walks along a trodden path or line which passes substantially over the line of mowing/trimming unless the cutting device 1 or 101 is deliberately tilted or longitudinally turned to alter course.

It will be appreciated by those skilled in the art that the configuration of the cutting devices is inherently safe. In the event that the operator should stumble, the safety brake and/or throttle control 21 is/are released, so the centrifugal clutch disengages the filaments 15. This enables the cutting devices to roll forward and the handles 3 to drop to the ground. This is a relative safe situation with the filaments 15 safely raising out of, and above, the ground while they are quickly stopped and without the possibility of the filaments 15 dislodging debris towards the operator, or possibly dragging the cutting devices forward against some other object or person etc.

Similarly, if the operator should fall over rearwardly for some reason such as tripping or slipping, then because the filaments 15 are the part furthest from the operator, and also because the wheel 2 is between the operator and the filaments 15, any rearward movement of the cutting device 1 or 101 is blocked by the wheel 2 coming into contact with the operator before the filaments 15 can strike the operator.

Figure 12:
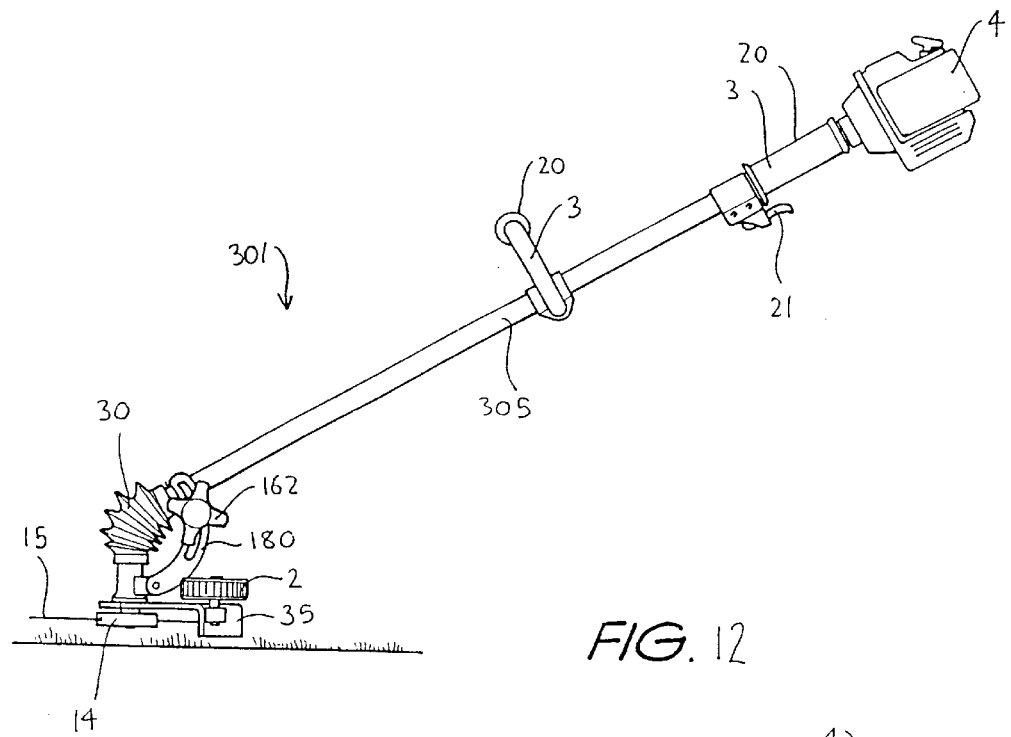
FIG. 12 is a left hand side view of a third powered cutting device able to horizontally mow and vertically trim, and illustrating the former.
Figure 13:
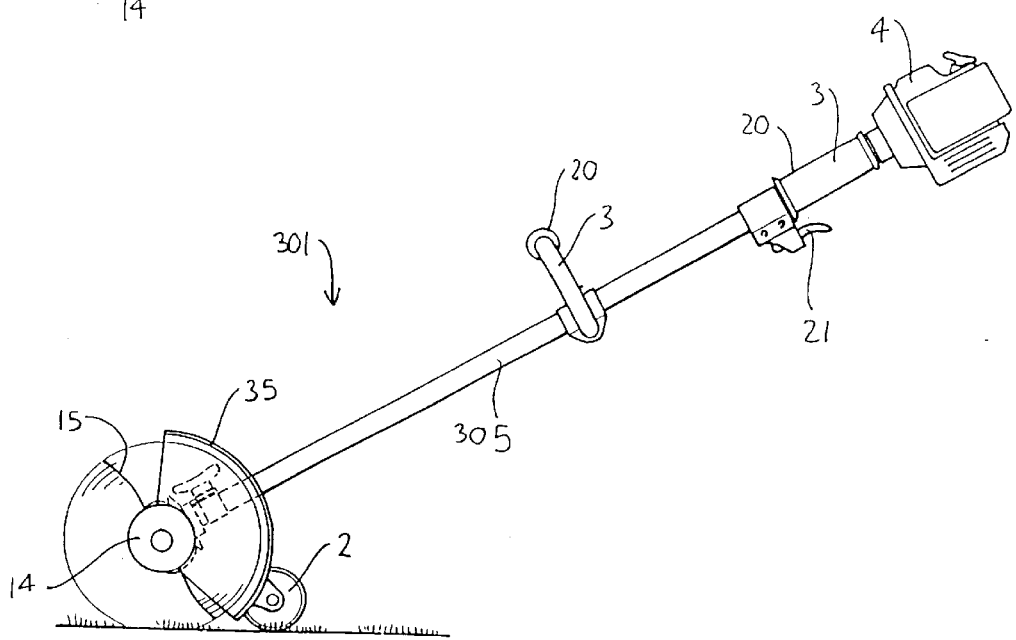
FIG. 13 is a view similar to FIG. 12 but illustrating the cutting device vertically trimming.

FIGS. 12 and 13 show a third embodiment of a powered cutting device 301 in which the power unit 4 is located on the rear end of an elongate frame 305 and the handles are located between the power unit 4 and the cutting means. This enables the cutting device 301 to be maneuvered in a manner similar to a brush cutter whilst horizontally mowing (FIG. 12) and like a stick edger, with the guiding assistance of the ground engaging wheel 2, whilst vertically trimming (FIG. 13).

Figure 14:
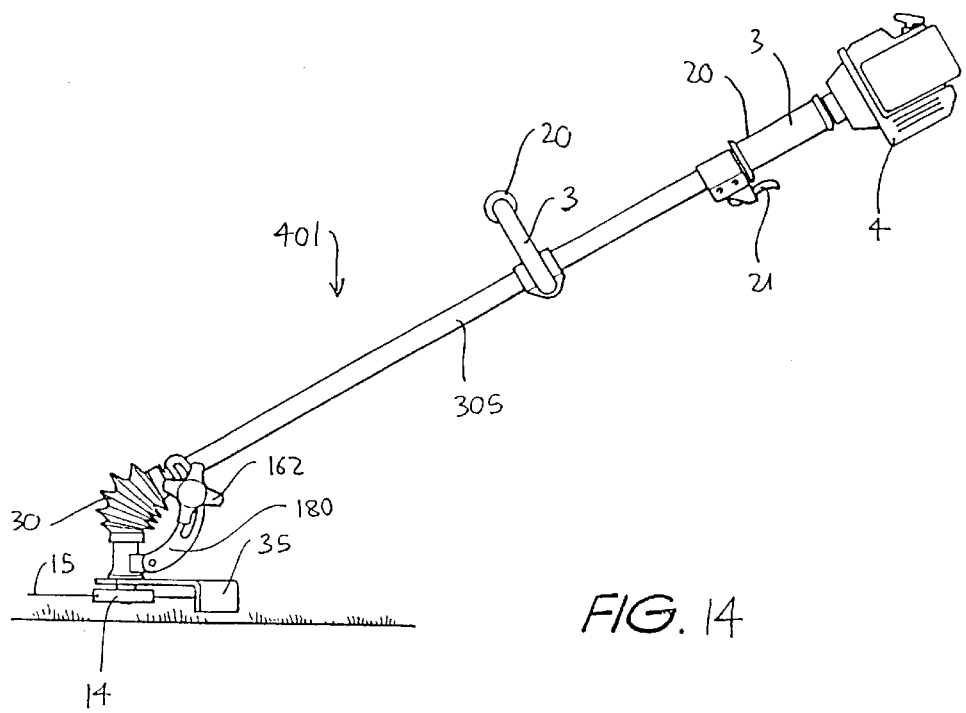
FIG. 14 is a left hand side view of a fourth powered cutting device able to horizontally mow and vertically trim, and illustrating the former.
Figure 15:
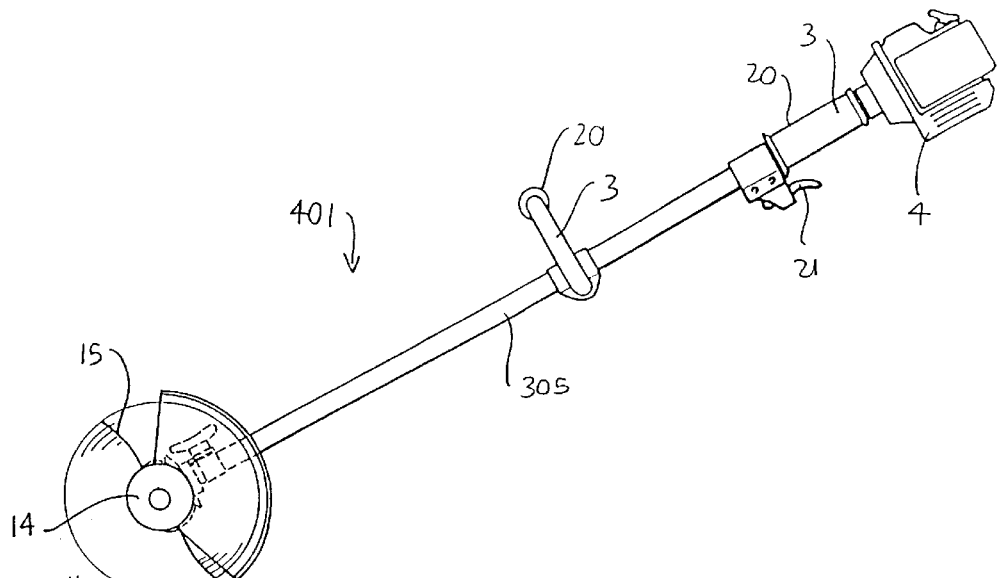
FIG. 15 is a view similar to FIG. 14 but illustrating the cutting device vertically trimming.

A fourth embodiment of a powered cutting device 401, similar to the third embodiment of cutting device 301, is shown in FIGS. 14 (mowing) and 15 (vertically trimming). The device 401 is identical to the cutting device 301 (and like features are indicated with like reference numerals) except that the wheel 2 has been removed, allowing the cutting device 401 to be maneuvered in much the same manner as a brush cutter during mowing and vertically trimming.

The foregoing describes only some embodiments of the present invention; and modifications, obvious to those skilled in the art, can be made thereto without departing from the scope of the present invention.

| PARTS LIST | | | |
|---|---|---|---|
| 1 | cutting device | 57 | clutch cover |
| 2 | ground engaging wheel | 101 | cutting device |
| | | 130 | gearbox casing |
| 3 | handle bars or handles | 139 | O-ring seal |
| 4 | power unit (engine or motor) | 140 | gimbal |
| | | 141 | gimbal |
| 5 | frame | 142 | pin |
| 9 | releasable handle | 149 | cylindrical stem |
| 11 | pivoted arm | 150 | shaft |
| | | 151 | shaft |
| 12 | height adjustment handle | 159 | cylindrical stem |
| 13 | height setting plate | 160 | crown gear |
| | | 161 | crown gear |
| 14 | hub | 162 | nut |
| 15 | nylon filaments | 163 | split sleeve |
| 16 | ground contacting leg stand | 164 | bolt |
| | | 165 | threaded aperture |
| 20 | hand grips | 180 | arcuate link |
| 21 | throttle control | 181 | arcuate slot |
| 25 | stem | 301 | cutting device |

PARTS LIST

-continued

| | | | |
|---|---|---|---|
| 30 | flexible rubber boot | 305 | frame |
| 35 | filament guard | 401 | cutting device |

α angle
β angle
A arrow
B arrow
C arrow
D arrow
E arrow

The claims defining the invention are as follows:

1. A powered vegetative cutting device maneuverable in the manner of a wheelbarrow, a brush cutter, or a stick edger by a walking operator and operable to both substantially horizontally mow vegetation and substantially vertically trim vegetation, said device comprising:
   a. an elongated frame having a forward end and a rearward end;
   b. handle means on said elongated frame;
   c. a power unit supported by said elongated frame;
   d. rotatable vegetative cutter means carried by said elongated frame, said rotatable vegetative cutter means being movable between a mowing position in which it rotates about a substantially vertical axis and a trimming position in which it rotates about a substantially horizontal axis;
   e. a power train interconnecting said power unit and said rotatable vegetative cutter means, said power train including a power directing means operable to rotate said rotatable vegetative cutter means in each said mowing position and said trimming position and comprising a pair of gimbals pivotally connected together, each gimbal having a shaft rotatably mounted therein, one of said shafts being driven by said power unit, and the other of said shafts driving said rotatable vegetative cutter means, the angle between said shafts being adjustable by said gimbals pivoting relative to each other, and each of said shafts having an end on which is mounted a gear, said gears intermeshing with each other and residing within said pair of gimbals; and,
   f. a releasable latch means connected to said gimbals and to a portion of said elongated frame which, when engaged, locks said rotatable vegetative cutter means in either the mowing position of the trimming position, and which when released, allows said rotatable vegetative cutter means to be moved from either of said two positions to the other of said two positions.

2. The powered vegetative cutting device as claimed in claim 1, wherein said releasable latch means comprises a slotted link member fixed to one of said gimbals, a split sleeve enveloping part of the other of said gimbals and a part of said elongated frame, and clamping means passing through said slotted link member and said split sleeve to clamp said other gimbal, said elongated frame, and said slotted link member together.

3. The powered vegetative cutting device as claimed in claim 1, wherein said power directing means is enclosed within a flexible boot.

4. The powered vegetative cutting device as claimed in claim 1, further including a ground engaging wheel means connected to said elongated frame.

5. The powered vegetative cutting device as claimed in claim 4, wherein said handle means is located at the rearward end of said elongated frame, said ground engaging wheel means is located adjacent to said forward end of said elongated frame, and said power unit is located between said handle means and said ground engaging wheel means, thereby causing the center of gravity of the powered vegetative cutting device to lie between said handle means and said ground engaging wheel means.

6. The powered vegetative cutting device as claimed in claim 1, wherein said ground engaging wheel means is located adjacent to said forward end of said elongated frame, said power unit is located at said rearward end of said elongated frame, and said handle means is located between said ground engaging wheel means and said power unit.

7. The powered vegetative cutting device as claimed in claim 1, wherein said rotatable vegetative cutter means comprising at least one filament.

* * * * *